(12) United States Patent
Li et al.

(10) Patent No.: US 11,871,183 B2
(45) Date of Patent: Jan. 9, 2024

(54) SINGLE MICROPHONE HEARING AID NOISE REDUCTION METHOD BASED ON BLUETOOTH HEADSET CHIP AND BLUETOOTH HEADSET

(71) Applicant: Shenzhen Tingduoduo Technology Co., Ltd., Shenzhen (CN)

(72) Inventors: Gaofeng Li, Shenzhen (CN); Jian Sun, Shenzhen (CN)

(73) Assignee: Shenzhen Tingduoduo Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/317,955

(22) Filed: May 16, 2023

(65) Prior Publication Data

US 2023/0283973 A1    Sep. 7, 2023

(30) Foreign Application Priority Data

May 23, 2022 (CN) .......................... 202210562487.7

(51) Int. Cl.
   *H04R 25/00* (2006.01)
   *H04R 1/10* (2006.01)
   *G10L 21/0208* (2013.01)

(52) U.S. Cl.
   CPC ......... *H04R 25/507* (2013.01); *H04R 1/1083* (2013.01); *H04R 25/554* (2013.01); *G10L 21/0208* (2013.01)

(58) Field of Classification Search
   CPC .............................. H04R 25/507; H04R 25/00
   See application file for complete search history.

(56) References Cited

U.S. PATENT DOCUMENTS 10,897,675 B1 * 1/2021 Tsitovich ................. G06N 3/08
11,330,378 B1 * 5/2022 Jelčicová ............ H04R 25/507
(Continued)

FOREIGN PATENT DOCUMENTS

| CN | 106157963 A | 11/2016 |
| CN | 107864441 A | 3/2018 |
| CN | 113793620 A | 12/2021 |

OTHER PUBLICATIONS

CNIPA, Notification of a First Office Action for Chinese application CN202210562487.7, dated Jun. 30, 2022.
(Continued)

*Primary Examiner* — Olisa Anwah (57) ABSTRACT

The present invention discloses a single microphone hearing aid noise reduction method. The method comprises: acquiring an original sound signal, identifying the noise characteristics of noise in the original sound signal; iteratively training the noise reduction formula obtained by noise identification, optimizing the noise reduction formula, and acquiring the optimal values of parameters in the noise reduction formula; calculating the original sound signal according to the noise reduction formula optimized by iterative training and the specific value of each parameter, and outputting the signal to noise ratio of the noise; and judging whether the signal to noise ratio is qualified, and if qualified, carrying out hearing aid processing of the processed sound signal. The present invention can quickly identify, suppress and converge unsteady noise by single microphone noise reduction without the aid of special iterative adaptive learning filter hardware built in a hearing aid chip.

9 Claims, 6 Drawing Sheets

(56) References Cited

U.S. PATENT DOCUMENTS

| | | | |
|---|---|---|---|
| 11,627,421 B1* | 4/2023 | Li .................. | H04R 25/554 |
| | | | 381/315 |
| 2011/0249844 A1* | 10/2011 | Merks .................. | H04R 25/505 |
| | | | 381/317 |
| 2014/0023218 A1* | 1/2014 | Woods ................ | G10L 21/0364 |
| | | | 381/317 |
| 2020/0260198 A1* | 8/2020 | Andersen ................ | G10L 25/51 |
| 2021/0185465 A1* | 6/2021 | Bramsløw ............ | H04R 25/507 |
| 2021/0409522 A1* | 12/2021 | Ferrari .............. | H04W 72/1215 |
| 2022/0124444 A1* | 4/2022 | Andersen ............. | H04R 25/507 |
| 2023/0034525 A1* | 2/2023 | Scheller ............... | H04R 25/405 |
| 2023/0037356 A1* | 2/2023 | Pontoppidan .......... | H04R 25/50 |
| 2023/0143347 A1* | 5/2023 | Jin .......................... | H04R 3/02 |
| | | | 381/318 |

OTHER PUBLICATIONS

CNIPA, Notification to grant patent right for Chinese application CN202210562487.7, dated Jul. 15, 2022.

* cited by examiner

SINGLE MICROPHONE HEARING AID NOISE REDUCTION METHOD BASED ON BLUETOOTH HEADSET CHIP AND BLUETOOTH HEADSET

TECHNICAL FIELD

The present invention relates to the technical field of sound processing, and particularly relates to a single microphone hearing aid noise reduction method and system based on a bluetooth headset chip, a bluetooth headset and a computer readable storage medium.

BACKGROUND

The hearing aid performs noise reduction on sounds that hearing-impaired people cannot hear, enhances and amplifies the human voice, and then sends the sounds to the auditory center of the brain using the residual hearing of hearing-impaired people so that the hearing-impaired people can feel the sounds, which brings great convenience to the hearing-impaired people.

At present, there are many hearing-impaired users who cannot hear or clearly hear talking of other people, music and broadcast or various sounds such as alarm, doorbell, trumpet and prompting tone like normal people. Hearing impairment is difficult to cure and can only be solved by wearing hearing aids.

Figure 1:
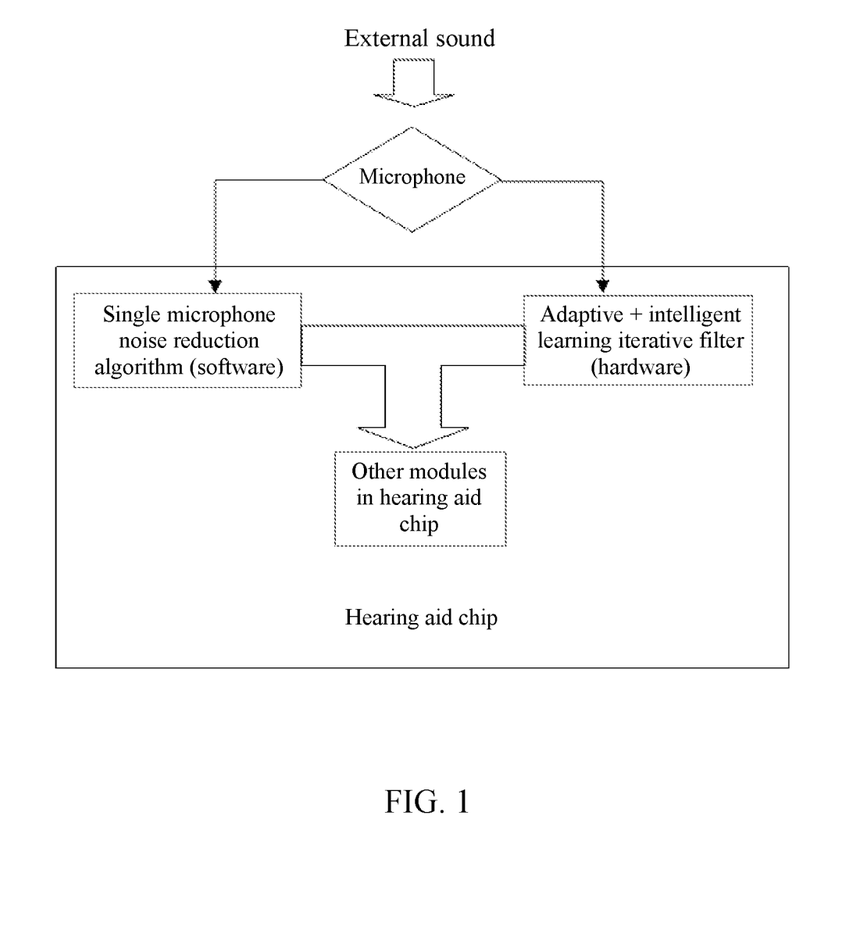
FIG. 1 is a schematic diagram of noise reduction of a hearing aid chip using a "single microphone noise reduction algorithm" (software)+an "adaptive intelligent learning hearing aid iterative filter" (hardware) in the prior art.

In the prior art, the key component of a hearing aid is a hearing aid chip, as shown in FIG. 1, and the most basic module in the hearing aid chip is a "single microphone noise reduction algorithm" (software)+an "adaptive intelligent learning hearing aid iterative filter" (hardware).

After the external sound comes in through the microphone, the "single microphone noise reduction algorithm" will perform noise reduction on background noises and murmurs, which lays the foundation for the hearing aid chip to extract and enhance useful sounds such as human voice, music, alarm tone and prompting tone subsequently. The sound received by a single microphone comes from a single source, no phase difference of the sound source signal exists, and the signal characteristics of noise cannot be effectively identified, so the single microphone is congenitally deficient in noise suppression. In short, a situation where ambient noises and murmurs cannot be suppressed at all may occur from time to time. Therefore, it is necessary to provide a hardware module of an "adaptive intelligent learning iterative filter" for cooperation: the hardware module learns the signal characteristics of different background noise patterns and murmurs from the outside world, and then input the signal characteristics to the "single microphone noise reduction algorithm". This cooperation can achieve stable suppression of background noises and murmurs in different environments.

However, the above solution must be realized with a special hearing aid chip (a universal bluetooth headset chip does not comprise an adaptive intelligent self-learning hearing aid iterative filter). But hearing aid chips have long been monopolized by a few merchants, resulting in very high prices of hearing aids on the market.

Therefore, the prior art needs to be improved and developed.

SUMMARY

The main purpose of the present invention is to provide a single microphone hearing aid noise reduction method based on a bluetooth headset chip, a bluetooth headset and a computer readable storage medium, aiming to solve the problem that the suppression of background noises and murmurs needs to be solved through a special hearing aid chip by a "single microphone noise reduction algorithm" (software)+an "adaptive intelligent learning hearing aid iterative filter" (hardware) in the prior art.

To achieve the above purpose, the present invention provides a single microphone hearing aid noise reduction method based on a bluetooth headset chip, and the single microphone hearing aid noise reduction method based on a bluetooth headset chip comprises the following steps:

Acquiring an original sound signal, identifying the noise characteristics of noise in the original sound signal, and calling different noise reduction formulas according to different types of noise;

Iteratively training the noise reduction formula obtained by noise identification, optimizing the noise reduction formula, and acquiring the optimal values of parameters in the noise reduction formula;

Calculating the original sound signal according to the noise reduction formula optimized by iterative training and the specific value of each parameter, and outputting the signal to noise ratio of the noise;

Judging whether the signal to noise ratio is qualified, and if qualified, carrying out hearing aid processing of the processed sound signal.

Optionally, in the single microphone hearing aid noise reduction method based on a bluetooth headset chip, the noise characteristics include energy distribution on the spectrum, intensity, steady state, transient state and pink noise.

Optionally, in the single microphone hearing aid noise reduction method based on a bluetooth headset chip, when different noise reduction formulas are called according to different types of noise, the original values of parameters in the noise reduction formula are default empirical values.

Optionally, in the single microphone hearing aid noise reduction method based on a bluetooth headset chip, during iterative training, each repetition of calculation is called an iteration, and the result of each iteration is used as the initial value of the next iteration.

Optionally, in the single microphone hearing aid noise reduction method based on a bluetooth headset chip, the steps of calculating the original sound signal according to the noise reduction formula optimized by iterative training and the specific value of each parameter and outputting the signal to noise ratio of the noise also comprise:

Ending the iterative training when the signal to noise ratio obtained by iterative training reaches the preset threshold.

Optionally, in the single microphone hearing aid noise reduction method based on a bluetooth headset chip, the signal to noise ratio is calculated as follows:

$$SNR=10*\log 10(S/N);$$

wherein SNR represents the signal to noise ratio, in dB; S represents the average power of a signal; and N represents the average power of noise.

Optionally, in the single microphone hearing aid noise reduction method based on a bluetooth headset chip, the step after judging whether the signal to noise ratio is qualified also comprises:

If the signal to noise ratio is unqualified, feeding back the related information to the front end to start the iterative training again.

In addition, to achieve the above purpose, the present invention also provides a single microphone hearing aid noise reduction system based on a bluetooth headset chip, wherein the single microphone hearing aid noise reduction system based on a bluetooth headset chip comprises:

A noise identification module, used for acquiring an original sound signal, identifying the noise characteristics of noise in the original sound signal, and calling different noise reduction formulas according to different types of noise;

An iterative training module, used for iteratively training the noise reduction formula obtained by noise identification, optimizing the noise reduction formula, and acquiring the optimal values of parameters in the noise reduction formula;

A parameter calculation module, used for calculating the original sound signal according to the noise reduction formula optimized by iterative training and the specific value of each parameter, and outputting the signal to noise ratio of the noise;

A judgment processing module, used for judging whether the signal to noise ratio is qualified, and if qualified, carrying out hearing aid processing of the processed sound signal.

In addition, to achieve the above purpose, the present invention also provides a bluetooth headset, wherein the bluetooth headset comprises a memory, a processor and single microphone hearing aid noise reduction programs based on a bluetooth headset chip which are stored in the memory and can run in the processor, and the single microphone hearing aid noise reduction programs based on a bluetooth headset chip implement the steps of the above single microphone hearing aid noise reduction method based on a bluetooth headset chip when being executed by the processor.

In addition, to achieve the above purpose, the present invention also provides a computer readable storage medium, wherein the computer readable storage medium contains single microphone hearing aid noise reduction programs based on a bluetooth headset chip, and the single microphone hearing aid noise reduction programs based on a bluetooth headset chip implement the steps of the above single microphone hearing aid noise reduction method based on a bluetooth headset chip when being executed by the processor.

The present invention comprises the following steps: acquiring an original sound signal, identifying the noise characteristics of noise in the original sound signal, and calling different noise reduction formulas according to different types of noise; iteratively training the noise reduction formula obtained by noise identification, optimizing the noise reduction formula, and acquiring the optimal values of parameters in the noise reduction formula; calculating the original sound signal according to the noise reduction formula optimized by iterative training and the specific value of each parameter, and outputting the signal to noise ratio of the noise; and judging whether the signal to noise ratio is qualified, and if qualified, carrying out hearing aid processing of the processed sound signal. The present invention can quickly identify, suppress and converge unsteady noise by single microphone noise reduction without the aid of special iterative adaptive learning filter hardware built in a hearing aid chip.

DETAILED DESCRIPTION

To make the purpose, the technical solution and the advantages of the present application more clear, the present invention is further described below in detail with reference to the drawings and the listed embodiments. It should be understood that the specific embodiments described herein are only used for explaining the present invention, not used for limiting the present invention.

Figure 2:
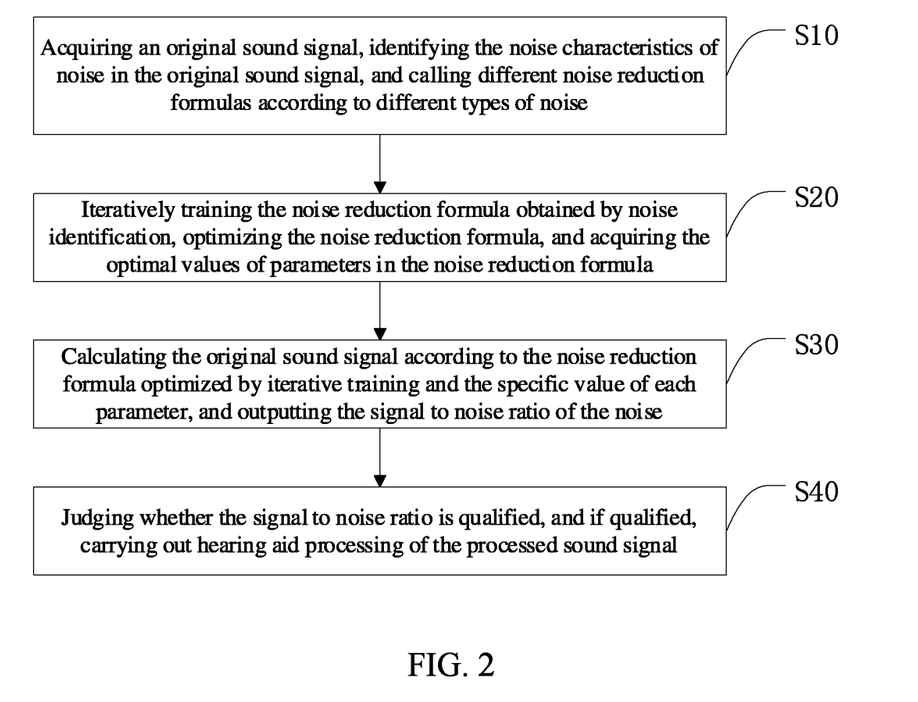
FIG. 2 is a flow chart of a preferred embodiment of a single microphone hearing aid noise reduction method based on a bluetooth headset chip of the present invention.
Figure 3:
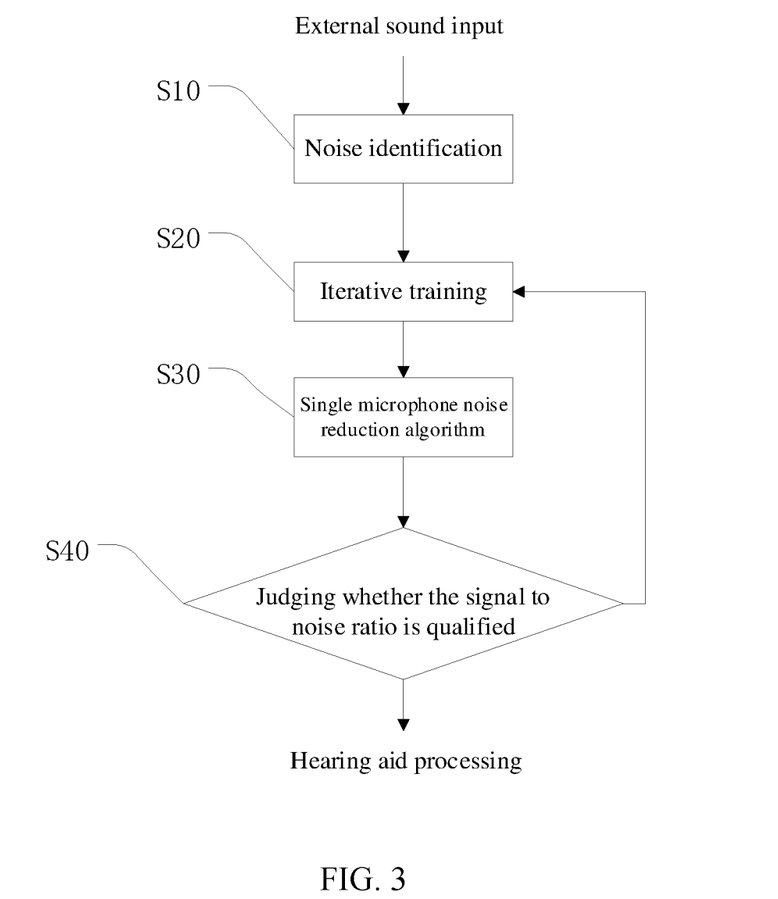
FIG. 3 is a flow chart of implementation of a preferred embodiment of a single microphone hearing aid noise reduction method based on a bluetooth headset chip of the present invention.

The single microphone hearing aid noise reduction method based on a bluetooth headset chip of a preferred embodiment of the present invention is shown in FIG. 2 and FIG. 3, and the single microphone hearing aid noise reduction method based on a bluetooth headset chip comprises the following steps:

Step S10: acquiring an original sound signal (external sound input), identifying the noise characteristics of noise in the original sound signal, and calling different noise reduction formulas according to different types of noise.

Specifically, the noise characteristics in the input original sound signal are identified: energy distribution on the spectrum, intensity, steady state, transient state and pink noise. Different noise reduction formulas $fn(n1, n2, n3, n4, n5 \ldots)$ are called according to different types of noise, wherein the values of parameters $n1, n2, \ldots$ are default empirical values during the first operation, i.e., when different noise reduction formulas are called according to different types of noise, the original values of parameters in the noise reduction formula are default empirical values.

Figure 4:
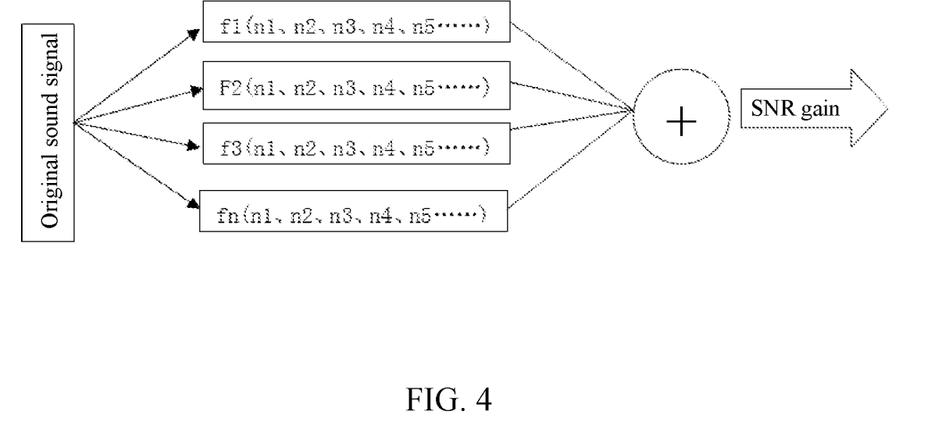
FIG. 4 is a schematic diagram of noise reduction of an original sound signal using a noise reduction formula.

As shown in FIG. 4, any noise reduction algorithm is essentially the use of a series of mathematical formulas. Supposing that the formula is to calculate the input and digitally sampled original sound signal by $f1(n1, n2, n3, n4, n5 \ldots)$, $f2(n1, n2, n3, n4, n5 \ldots)$, $f3(n1, n2, n3, n4, n5), \ldots, fn(n1, n2, n3, n4, n5)$ so that the calculated sound signal has a better signal-to-noise ratio, that is, the useful signal in the original sound is stronger and clearer.

Therefore, the key point is which formula or formulas to call during noise reduction calculation and how to value the parameters $n1, n2, n3, n4, n5 \ldots$ in a called formula, which are related to whether the signal to noise ratio of the processed original sound signal can be effectively enhanced. The core of the present invention is to accurately judge which formula or formulas to call and how to value the parameters in each formula through a self-developed "artificial intelligent learning" software module, and then to inform the "single microphone noise reduction algorithm".

Further, the noise suppressor filter is composed of the following combination filter:

$$H(z) = g \cdot \frac{F_N(z/a) \cdot F_S(z/b)}{F_S(z/c)};$$

wherein H(z) represents a filter, g represents a gain, $F_N(z/a)$, $F_S(z/b)$ and $F_S(z/c)$ represent the frequency spectra of an input signal, and a, b and c represent adaptive coefficients of bandwidth expansion, which are used for controlling the relative energy attenuation in the frequency domain, wherein b>c. The adaptive gain factor controls the overall signal energy attenuation, all of these parameters are calculated from the estimated real-time signal to noise ratio (SNR) and the spectral tilt similarity between the voice and the noise signal.

SNR and noise spectra are calculated in the inactive part of the signal, wherein only the noise is present, not the actual voice signal. The indication of active or inactive voice is completed by a special voice detection algorithm that uses energy and spectrum slope information to perform signal classification tasks.

The noise reduction algorithm of the present invention uses a linear filter and LPC (all-pole, Linear Predictive Coding) spectrum estimation method, and the spectrum of the background noise is estimated and represented during the inactive part of the voice. Since the spectrum of a pure background noise usually does not contain significant formants (i.e., frequency peaks) and gradually decays with the increase of the frequency, it is sufficient to model the noise spectrum using a simple first-order LPC model in most cases. The spectrum of the input signal is expressed as $F_S(z)$ at any time. When the spectrum slope of the noisy voice signal is close to that of the pure background noise, only the spectral valley area of FS(z) needs to be reduced; otherwise, an inverse filter FN(z) will be used to reduce the energy of the noise component.

Step S20: iteratively training the noise reduction formula obtained by noise identification, optimizing the noise reduction formula, and acquiring the optimal values of parameters in the noise reduction formula.

Specifically, the iterative training, i.e., artificial intelligent learning, is to repeat the calculation of the feedback process, aiming to select the optimal noise reduction formula fn(n1 n2 n3 n4 n5) and parameters thereof as far as possible. Each repetition of calculation is called an "iteration", and the result of each iteration is used as the initial value of the next iteration. According to the preliminary judgment of noise identification, each type of noise characteristic is continuously tracked and learned to quickly optimize one or several required noise reduction formulas and the values of specific parameters in each formula.

Because the front-end preclassification of noise cannot be 100% reliable, and the noise may be changing rapidly, the parameters in the noise reduction formula need to be adjusted according to the changes, so the parameters will be adjusted in time according to the output feedback.

Iterative training is carried out until the signal to noise ratio (SNR) reaches an appropriate value (this preset threshold can be preset in advance). Of course, it is extremely possible that the SNR fails to reach the threshold in any case, so the algorithm will have a set of default parameters to abandon the iterative training.

Step S30: calculating the original sound signal according to the noise reduction formula optimized by iterative training and the specific value of each parameter, and outputting the signal to noise ratio of the noise.

Specifically, the original sound signal input from the outside is calculated according to the noise reduction formula selected by iterative training and the specific value of each parameter, and the iterative training is mainly to estimate the output signal to noise ratio (SNR).

wherein the signal to noise ratio (SNR) is calculated as follows:

$$SNR=10*\log 10(S/N);$$

wherein SNR represents the signal to noise ratio, in dB; S represents the average power of a signal; and N represents the average power of noise.

If (SNR>threshold)
Signal output
Else
Adjusting the parameters of the filter.

Step S40: judging whether the signal to noise ratio is qualified, and if qualified, carrying out hearing aid processing of the processed sound signal.

Specifically, the sound signal processed by noise reduction is measured and analyzed, whether the signal to noise ratio of various noises is qualified is judged, if qualified, the processed sound is input to the subsequent hearing aid processing link, and if not qualified, the related information is fed back to the front end to start the iterative training again. The key point is the ability to iterate on a universal bluetooth headset chip fast enough to quickly suppress various noises so as to lay the foundation for subsequent enhancement of human voice and useful sounds.

In the present invention, a software function module of "artificial intelligent learning" is added to the traditional "single microphone noise reduction algorithm", and the code running efficiency is greatly optimized so that the universal bluetooth headset chip platform can run RISCV/ARM/MIPS; The present invention can quickly identify, suppress and converge unsteady noise by single microphone noise reduction without the aid of special iterative adaptive learning filter hardware built in a hearing aid chip. In other words, the same function as single microphone hearing aid noise reduction can be realized by loading the single microphone hearing aid noise reduction algorithm of the present invention into any universal bluetooth headset chip, which lays the foundation for the next step of replacing the expensive hearing aid chip with a universal bluetooth headset chip. The limitation that the single microphone noise reduction hearing aid algorithm must rely on a special hearing aid chip to work is completely broken, and the most critical and basic functions of hearing aids can be achieved by an ordinary bluetooth chip platform such as RISCV/ARM/MIPS, which thoroughly breaks decades of monopoly of foreign investors and brings down the hearing aids from high prices to the price range of ordinary electronic products, thus reducing the purchase cost for users and providing convenience for users.

In addition, the present invention can also be installed in ANDROID and Apple phones, watches, bracelets and other bluetooth wearable electronic products to realize the hearing aid function through combination of wearable electronic products such as phone, watch, bracelet and bluetooth blood pressure monitor+a headset.

Figure 5:
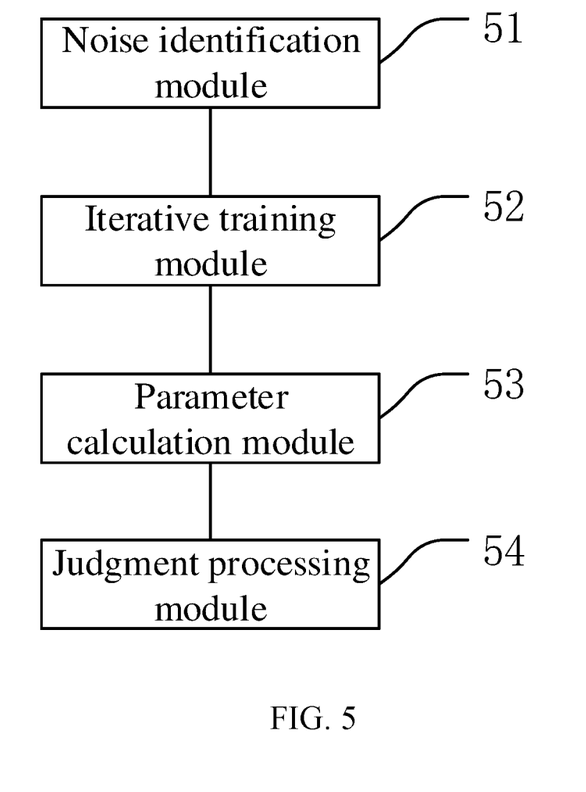
FIG. 5 is a schematic diagram of a preferred embodiment of a single microphone hearing aid noise reduction system based on a bluetooth headset chip of the present invention.

Further, as shown in FIG. 5, on the basis of the above single microphone hearing aid noise reduction method based on a bluetooth headset chip, the present invention also provides a single microphone hearing aid noise reduction system based on a bluetooth headset chip, wherein the single microphone hearing aid noise reduction system based on a bluetooth headset chip comprises:

A noise identification module 51, used for acquiring an original sound signal, identifying the noise characteristics of noise in the original sound signal, and calling different noise reduction formulas according to different types of noise;

An iterative training module 52, used for iteratively training the noise reduction formula obtained by noise identification, optimizing the noise reduction formula, and acquiring the optimal values of parameters in the noise reduction formula;

A parameter calculation module 53, used for calculating the original sound signal according to the noise reduction formula optimized by iterative training and the specific value of each parameter, and outputting the signal to noise ratio of the noise;

A judgment processing module 54, used for judging whether the signal to noise ratio is qualified, and if qualified, carrying out hearing aid processing of the processed sound signal.

Figure 6:
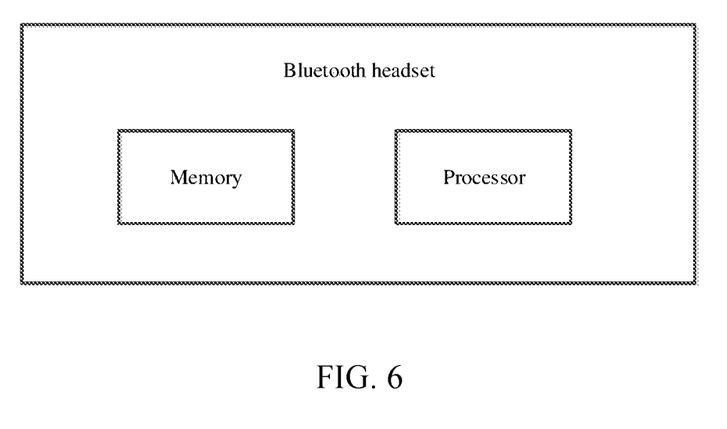
FIG. 6 is a schematic diagram of an operating environment of a preferred embodiment of a bluetooth headset of the present invention.

Further, as shown in FIG. 6, on the basis of the above single microphone hearing aid noise reduction method and system based on a bluetooth headset chip, the present invention also provides a bluetooth headset, wherein the bluetooth headset comprises a memory, a processor and single microphone hearing aid noise reduction programs based on a bluetooth headset chip which are stored in the memory and can run in the processor. In an embodiment, the processor implements the following steps when executing the single microphone hearing aid noise reduction programs based on a bluetooth headset chip in the memory.

Acquiring an original sound signal, identifying the noise characteristics of noise in the original sound signal, and calling different noise reduction formulas according to different types of noise;

Iteratively training the noise reduction formula obtained by noise identification, optimizing the noise reduction formula, and acquiring the optimal values of parameters in the noise reduction formula;

Calculating the original sound signal according to the noise reduction formula optimized by iterative training and the specific value of each parameter, and outputting the signal to noise ratio of the noise;

Judging whether the signal to noise ratio is qualified, and if qualified, carrying out hearing aid processing of the processed sound signal.

Wherein the noise characteristics include energy distribution on the spectrum, intensity, steady state, transient state and pink noise.

Wherein when different noise reduction formulas are called according to different types of noise, the original values of parameters in the noise reduction formula are default empirical values.

Wherein during iterative training, each repetition of calculation is called an iteration, and the result of each iteration is used as the initial value of the next iteration.

Wherein the steps of calculating the original sound signal according to the noise reduction formula optimized by iterative training and the specific value of each parameter and outputting the signal to noise ratio of the noise also comprise:

Ending the iterative training when the signal to noise ratio obtained by iterative training reaches the preset threshold.

wherein the signal to noise ratio is calculated as follows:

$$SNR=10*\log 10(S/N);$$

wherein SNR represents the signal to noise ratio, in dB; S represents the average power of a signal; and N represents the average power of noise.

Wherein the step after judging whether the signal to noise ratio is qualified also comprises:

If the signal to noise ratio is unqualified, feeding back the related information to the front end to start the iterative training again.

The present invention also provides a computer readable storage medium, wherein the computer readable storage medium contains single microphone hearing aid noise reduction programs based on a bluetooth headset chip, and the single microphone hearing aid noise reduction programs based on a bluetooth headset chip implement the steps of the above single microphone hearing aid noise reduction method based on a bluetooth headset chip when being executed by the processor.

In conclusion, the present invention provides a single microphone hearing aid noise reduction method based on a bluetooth headset chip and a bluetooth headset. The method comprises: acquiring an original sound signal, identifying the noise characteristics of noise in the original sound signal, and calling different noise reduction formulas according to different types of noise; iteratively training the noise reduction formula obtained by noise identification, optimizing the noise reduction formula, and acquiring the optimal values of parameters in the noise reduction formula; calculating the original sound signal according to the noise reduction formula optimized by iterative training and the specific value of each parameter, and outputting the signal to noise ratio of the noise; and judging whether the signal to noise ratio is qualified, and if qualified, carrying out hearing aid processing of the processed sound signal. The present invention can quickly identify, suppress and converge unsteady noise by single microphone noise reduction without the aid of special iterative adaptive learning filter hardware built in a hearing aid chip.

It should be noted that terms of "comprise", "include" or any other variant herein are intended to cover non-exclusive inclusion, so that a process, a method, an article or a bluetooth headset which includes a series of elements not only includes such elements, but also includes other elements not listed clearly or also includes inherent elements in the process, the method, the article or the bluetooth headset. Under the condition of no more limitation, the elements defined by a sentence "include one . . . " do not exclude additional identical elements in the process, the method, the article or the bluetooth headset which includes the elements.

Of course, those ordinary skilled in the art can understand that all or some flows of the method of the above-mentioned embodiment can be implemented through hardware (such as processor and controller) instructed by a computer program, the program can be stored in a computer readable storage medium, and the program may include the flows of the embodiments of the above methods when being executed, wherein the computer readable storage medium can be a memory, magnetic disc, optical disc, etc.

It should be understood that the application of the present invention is not limited to the above examples, improvements and alternations can be made according to the above description for those ordinary skilled in the art, and all these improvements and alternations shall belong to the protection scope of appended claims of the present invention.

What is claimed is:

1. A single microphone hearing aid noise reduction method based on a bluetooth headset chip, wherein the single microphone hearing aid noise reduction method based on a bluetooth headset chip comprises:

acquiring an original sound signal, identifying the noise characteristics of noise in the original sound signal, and calling different noise reduction formulas according to different types of noise, wherein the original values of parameters in the noise reduction formula are default empirical values;

iteratively training the noise reduction formula obtained by noise identification;

during iterative training, each repetition of calculation is called an iteration, and the result of each iteration is used as the initial value of the next iteration; ending the iterative training when the signal to noise ratio obtained by iterative training reaches the preset threshold; and optimizing the noise reduction formula, and acquiring the optimal values of parameters in the noise reduction formula;

calculating the original sound signal according to the noise reduction formula optimized by iterative training and the specific value of each parameter, and outputting the signal to noise ratio of the noise;

and judging whether the signal to noise ratio is qualified, and if qualified, carrying out hearing aid processing of the processed sound signal; the iteration speed is high enough on a universal bluetooth headset chip to quickly suppress various noises, and the single microphone hearing aid noise reduction algorithm is loaded into any universal bluetooth headset chip to achieve the same function as single microphone hearing aid noise reduction in the hearing aid chip.

2. The single microphone hearing aid noise reduction method based on a bluetooth headset chip according to claim 1, wherein the noise characteristics include energy distribution on the spectrum, intensity, steady state, transient state and pink noise.

3. The single microphone hearing aid noise reduction method based on a bluetooth headset chip according to claim 1, wherein the signal to noise ratio is calculated as follows:

$SNR=10*\log 10(S/N);$ wherein SNR represents the signal to noise ratio, in dB; S represents the average power of a signal; and N represents the average power of noise.

4. The single microphone hearing aid noise reduction method based on a bluetooth headset chip according to claim 1, wherein the step after judging whether the signal to noise ratio is qualified also comprises:

if the signal to noise ratio is unqualified, feeding back the related information to the front end to start the iterative training again.

5. A single microphone hearing aid noise reduction system based on a bluetooth headset chip, wherein the single microphone hearing aid noise reduction system based on a bluetooth headset chip comprises:

a noise identification module, used for acquiring an original sound signal, identifying the noise characteristics of noise in the original sound signal, and calling different noise reduction formulas according to different types of noise, wherein the original values of parameters in the noise reduction formula are default empirical values;

an iterative training module, used for iteratively training the noise reduction formula obtained by noise identification; during iterative training, each repetition of calculation is called an iteration, and the result of each iteration is used as the initial value of the next iteration; ending the iterative training when the signal to noise ratio obtained by iterative training reaches the preset threshold; and optimizing the noise reduction formula, and acquiring the optimal values of parameters in the noise reduction formula;

a parameter calculation module, used for calculating the original sound signal according to the noise reduction formula optimized by iterative training and the specific value of each parameter, and outputting the signal to noise ratio of the noise;

a judgment processing module, used for judging whether the signal to noise ratio is qualified, and if qualified, carrying out hearing aid processing of the processed sound signal; the iteration speed is high enough on a universal bluetooth headset chip to quickly suppress various noises, and the single microphone hearing aid noise reduction algorithm is loaded into any universal bluetooth headset chip to achieve the same function as single microphone hearing aid noise reduction in the hearing aid chip.

6. A non-transitory computer readable storage medium, wherein the computer readable storage medium contains single microphone hearing aid noise reduction programs based on a bluetooth headset chip, and the single microphone hearing aid noise reduction programs based on a bluetooth headset chip implement the steps of the single microphone hearing aid noise reduction method based on a bluetooth headset chip of claim 1 when being executed by the processor.

7. A non-transitory computer readable storage medium, wherein the computer readable storage medium contains single microphone hearing aid noise reduction programs based on a bluetooth headset chip, and the single microphone hearing aid noise reduction programs based on a bluetooth headset chip implement the steps of the single microphone hearing aid noise reduction method based on a bluetooth headset chip of claim 2 when being executed by the processor.

8. A non-transitory computer readable storage medium, wherein the computer readable storage medium contains single microphone hearing aid noise reduction programs based on a bluetooth headset chip, and the single microphone hearing aid noise reduction programs based on a bluetooth headset chip implement the steps of the single microphone hearing aid noise reduction method based on a bluetooth headset chip of claim 3 when being executed by the processor.

9. A non-transitory computer readable storage medium, wherein the computer readable storage medium contains single microphone hearing aid noise reduction programs based on a bluetooth headset chip, and the single microphone hearing aid noise reduction programs based on a bluetooth headset chip implement the steps of the single microphone hearing aid noise reduction method based on a bluetooth headset chip of claim 4 when being executed by the processor.

* * * * *